United States Patent [19]
Di Tella et al.

[11] 3,857,250
[45] Dec. 31, 1974

[54] UNDERWATER VEHICLE FOR LAYING UNDERGROUND CABLES AND PIPELINES

[75] Inventors: Vincenzo Di Tella, Capella di Torre Gaveta; Adolfo Rodighiero, Venezia, both of Italy

[73] Assignee: Tecnomare S.p.A., Venezia, Italy

[22] Filed: Apr. 4, 1973

[21] Appl. No.: 347,542

[30] Foreign Application Priority Data
Apr. 7, 1972    Italy................................. 22855/72

[52] U.S. Cl. ............................................. 61/72.4
[51] Int. Cl............................................... E02f 5/06
[58] Field of Search .................... 61/72.4; 37/62, 63

[56]    References Cited
UNITED STATES PATENTS
3,338,059   8/1967   Tittle ................................... 61/72.4
3,434,297   3/1969   Gretter et al. ........................ 61/72.4
3,583,170   6/1971   De Vries............................... 61/72.4
3,590,589   7/1971   Smulders .............................. 61/72.4
3,670,514   6/1972   Breston et al........................ 61/72.4
3,732,700   5/1973   Lynch................................... 61/72.4

Primary Examiner—Jacob Shapiro
Attorney, Agent, or Firm—Ralph M. Watson

[57]    ABSTRACT

A self-powered submergence vehicle is provided with digging tools for entrenching previously laid pipelines on the like. Movement of the vehicle is controlled through the sensing of the position of the pipeline so that deviations in the movement of the vehicle relative to the pipeline are automatically compensated for.

6 Claims, 3 Drawing Figures

UNDERWATER VEHICLE FOR LAYING UNDERGROUND CABLES AND PIPELINES

Many systems are already known for the laying underground of underwater pipelines. Many of them consist essentially of a frame resting on the same pipeline or on the sea bottom and towed along the axis of the pipeline to be laid underground by a mother ship. On this frame there are disgregating tools and expirating apparatus which make it possible to dig a trench and remove the wastes. All these systems have some limitations as to the use and present several drawbacks: difficulty of towing the apparatus along the axis of the pipeline; need of use for the towing of additional apparatus on the sea bottom; limiting the apparatus weight and accordingly the power requirement in order to limit the stress on the pipeline; poor adaptability to the diameter of different pipelines, in particular for the small sized types; limitations in the depths of trenches to be digged; impossibility of covering the pipelines after the digging.

As to the laying underground of cables it has been impossible up to now to find a system better than digging the trench before the laying of the cable or digging the bottom under the cable already laid by means of half-manual systems.

In the first case there is the difficulty of laying the cable in the trench already dug and in the second case there is the drawback of an expensive employment of frogmen and of a limited depth of laying. It is well known to use self-propelled underwater vehicles on which are mounted dredging apparatus of the mentioned type, but such vehicles are designed for carrying out generic dredging works.

The present invention aims at a vehicle which, making use, in part, of elements known in the prior art and introducing, in part, new elements, combines both in such a configuration up to now to eliminate the drawbacks and the limitation up to now present in the prior art.

Further in the vehicle, there are new features which render it suitable for laying both cables and pipelines underground.

The vehicle, which will be described in detail hereinafter, comprises essentially a self-propelled apparatus which may operate both on sea bottom or other surface, which rides on the pipeline or on the cable to be laid underground and is provided of two digging apparatus mounted at the end of two articulated arms.

Besides the novelty of the configuration the vehicle presents a new device, particularly planned for laying underground cables or pipes of smaller diameter, comprising an automatic guiding system allowing the vehicle to follow the path of the object to be digged without exerting an efforts thereon.

The following specification relates to FIG. 1 and 2 showing a practical realisation given by way of and unrestrictive example since it is possible to make many modifications and/or variants thereto within the scope of the present invention.

FIG. 1a is a fragmentary perspective view illustrating the device for covering cables utilized in connection with the vehicle of FIG. 1.

FIG. 2 is an enlarged end view of an alternative embodiment of a vehicle guiding system designed to lay underground cables or the like.

Figure 1:
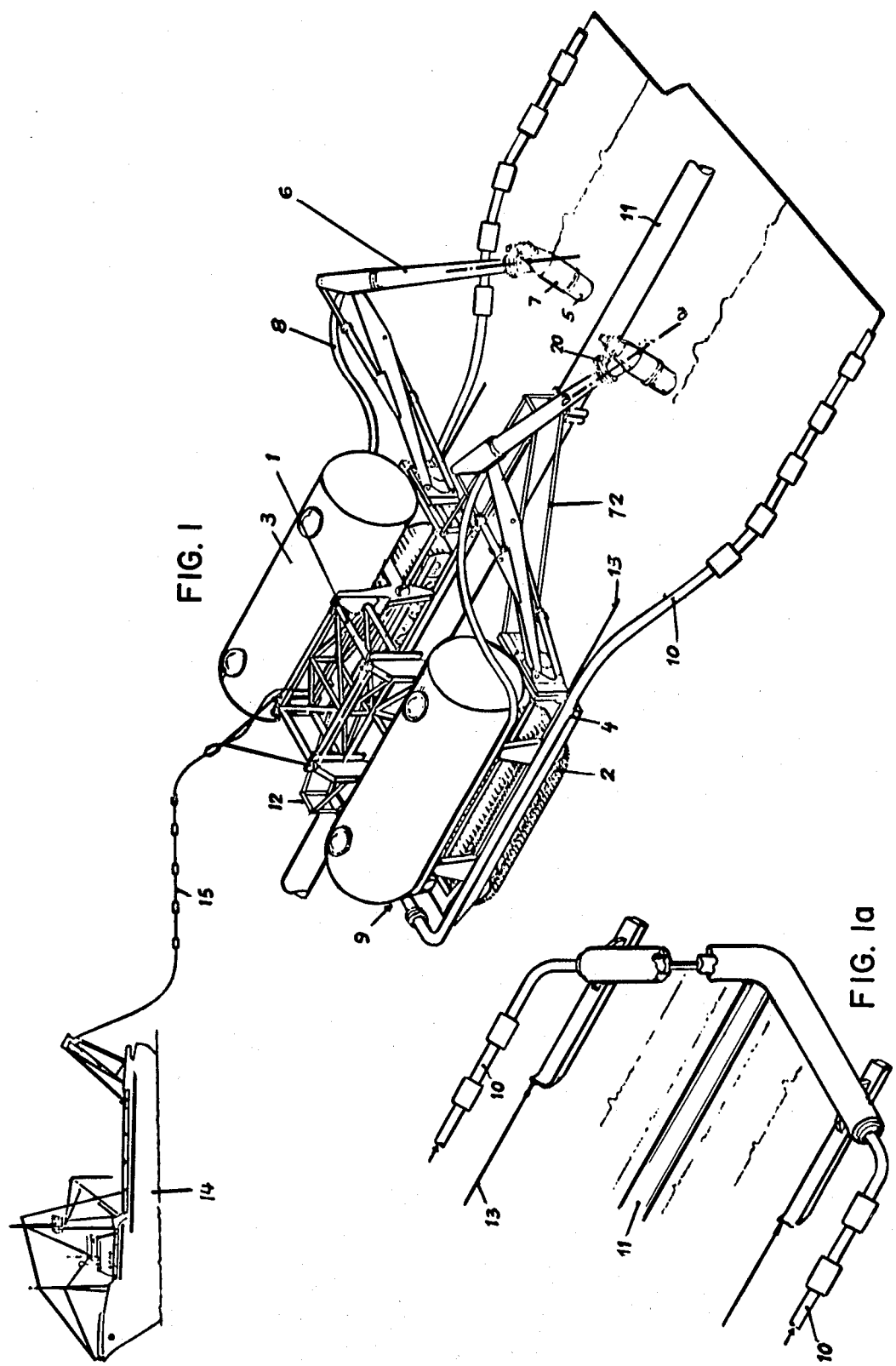
FIG. 1 is a fragmentary perspective view of an exemplary embodiment of the vehicle of the present invention.

The vehicle comprises essentially a frame 1 which, in all its cross-sections, presents an inverted U-shape the after gauge insert which is modular-shaped frame allows the vehicle to have a gauge variable according to the size of the body to be buried. The frame rests on the locomotion or drive means which, in the illustrated embodiment, includes a pair of laterally spaced-apart tracks 2 but could consist, if required, of wheels.

On the frame is mounted a hull 3 having two cylinder-shaped shells. A very important feature of the system which is designed to prevent the vehicle from sinking in very soft bottoms and to improve the movement thereon, is slides 4.

In the drawing only two slides are shown but, if required, there may be more than two and have a different size. These slides work according to a double principle. Firstly they provide an increase of the supporting surface at their first contact with the bottom, secondly, in case of a further sinking of the vehicle into the half-liquid mud, they give an increase of the buoyancy period. The buoyancy is proportional to the specific gravity of the mud and the depth of sinking.

The vehicle digs the trench by using a combination of disgregating tools and sucking pump. The disgregating tools 5 are mounted at the end of articulated arms 6 and rotated around their longitudinal axis by motors located in the cases 7. Cases 7 of the tools may be oriented around the axes $a-a$ by means of suitable motors 20. The detrita moved by the tools are sucked in mixture with water through the same tools and the pipes 8 of the centrifugal pumps 9 (mounted on the frontal part of the vehicle and not shown in the drawing) and discharged through the hoses 10. For effecting the trench digging works the vehicle is set astride to pipe 11 and the tools 5 allowed to dig on both sides of the pipe, sinking gradually into the ground until they reach the required depth. At that moment there are two alternatives: either the dug out walls collapse spontaneously and the slopes assume a natural angle, or the consistency of the soil is such the dug out walls remain vertical.

In the first case it is sufficient that, during the digging, the vehicle moves forward slowly along the pipe axis, keeping the tools at the bottom of the trench in order that the trench assumes a natural trapezoidal section. In the second case the vehicle will move by steps and while the vehicle is stationary, by suitably making use of the articulated arms 6 and of the orientability of the tools around the axes $a-a$, ground will be removed from under the pipe giving thereby the trench the required shape.

The vehicle can follow automatically the path of the pipe and automatically correct deviations of its course from the pipe axis, without exerting any effort on the pipe.

This is obtained by means of pantographs 12 which are connected to sensors, to measure at two points the deviations of the vehicle axis relative to the pipe axis. These measurements serve as inlet data for a servo-assisting circuit which acts on the track engines by varying independently the speed of the tracks and thereby compensate the above-mentioned deviations.

At the front of the vehicle is an auxiliary system for digging which may comprise, in its simplest form, high pressure water jets.

The purpose of this auxiliary system organ is set free the pipe from deposits which might have covered it and inhibit the regular operation of pantographs 12. The detritus discharged from the pumps are conveyed through hoses 10 to a device FIG. 1a, towed by cables 13 at a suitable distance behind the vehicle and designed to discharge them on the pipeline 11 layed on the bottom of the trench and thereby cover the pipeline.

The power required for the movement and for the working of the vehicle is generated at the surface, on a mother ship 14 and transmitted to the vehicle by means of a "flexible duct" 15, which, according to the chosen type of power, consists of a pipeline for hydraulic oil or of an electric cable.

In the "flexible duct" are also comprised the electric cables necessary for the transmission, from the mother ship to the vehicle and vice versa, of all the measurement and driving signals required for the control of the vehicle.

In order to utilize the same vehicle for laying underground electric cables, only little modifications are necessary.

The modification concern the guiding system and are due to the fact that, because of the reduced diameter of the cables, it is difficult to follow them by means of mechanical feelers, particularly if they are partially covered in the mud.

Figure 2:
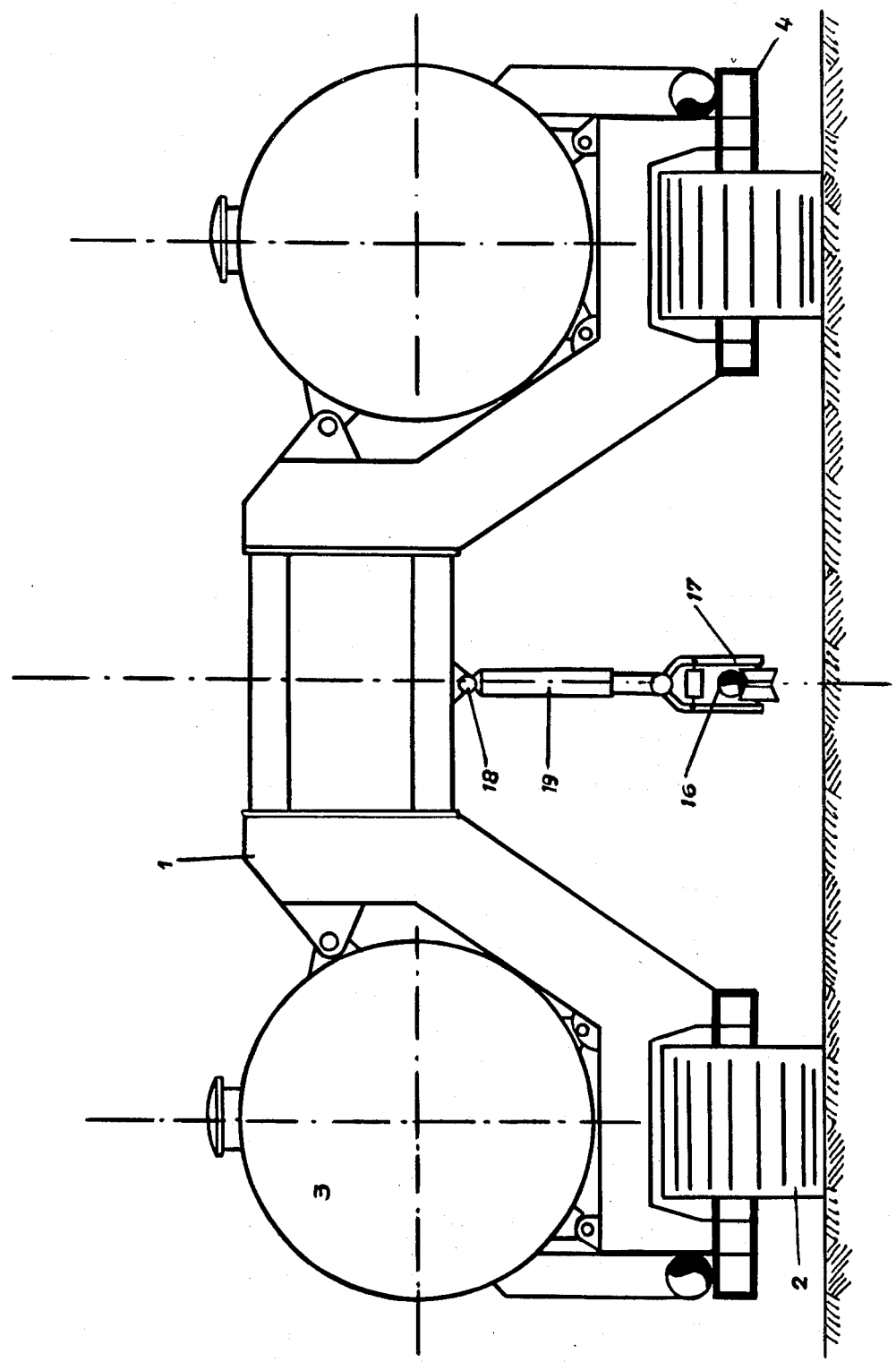

FIG. 2 shows the vehicle at the height of the front and back cross members of the frame and shows the devices which replace the pantographs 11 of FIG. 1 when a cable is to be layed underground.

The cable (16 in FIG. 2) is lifted from the bottom and let to pass in two front and back supports 17, in which it slides during the forward movement of the vehicle.

These supports are free of oscillating about a pivot 18 in a plane transverse to the axis of the vehicle.

The deviations of the supports from the central position are measured. The deviations represent an index of the displacements of the vehicle from the axis of the cable and their measurements are utilized as input data for the same regulation circuit already described in the case of the pipe.

Supports 17 are characterized in that they are sustained by hydraulic cylinders 19 in which the oil is kept under constant pressure in order to exert a constant and prefixed effort on the cable.

Alternatively, the vehicle may follow the cable by localizing the position with electronics means.

In any case, of a pipe or whether a cable is to be followed the guiding takes advantage of the same principle: measurement, by means of a system suitable to the specific case, at the deviation of the route of the vehicle from the direction of the pipe or of the cable and utilization of the measurement signals in a control system individually which acts individually on the speed of each track independently.

The same deviation measurements are presented to the operator on the control panel allowing him either to control the regular operation of the automatic guide device, or, at his choice, to exclude the automatic device self, and to vary manually, on the base of the indications of the deviation measurement device, the speeds of the tracks and therefore to guide manually the vehicle.

The vehicle has no man on board; the operator is on the mother ship where, on a control panel, he has at his disposal both the indications and the measurements necessary to control the operation of the vehicle and the means for the remote-control of the operations. Multiplex techniques are used in order to reduce to the minimum the number of the conductors necessary to the exchange of information between vehicle and surface.

We claim:

1. A vehicle for underwater entrenching of a pipeline or cable in a sea bed comprising: frame means adapted to be positioned in overlying relationship with said pipeline; drive means on said frame means adapted to propel the vehicle along the sea bed; survey means mounted on said frame means and adapted to be in contact with said pipeline for sensing deviations of the movement of the vehicle from the path of the pipeline; servo means adapted to receive a signal output from said survey means, said servo means being operatively coupled to said drive means whereby the direction of movement of the vehicle relative to the pipeline is controlled; and articulated arms mounted at one end to said frame means and having digging tools articulately mounted at the other end thereof, whereby a trench may be dug beneath said pipeline.

2. The vehicle of claim 1, wherein said drive means includes a pair of laterally spaced-apart tracks, whereby said vehicle may bridge said pipeline.

3. The vehicle of claim 2, further including supplementary support means located adjacent each of said tracks to prevent excessive sinking of said vehicle into the sea bed.

4. The vehicle of claim 1, further including means for covering the pipelines subsequent to its positioning in the trench.

5. The vehicle of claim 1, wherein said survey means includes a pantograph attached at one end of said frame means and adapted to slidably engage and follow the pipeline at the other end.

6. The vehicle according to claim 1, wherein said survey means includes a vertically disposed hydraulic cylinder, the cylinder being pivotally attached at its upper end to said frame means and adapted to slidably engage a cable at its other end, said cylinder being charged with a constant pressure whereby said cable may be carried at a prefixed tension.

* * * * *